United States Patent
Blakeley et al.

(10) Patent No.: US 9,512,940 B2
(45) Date of Patent: Dec. 6, 2016

(54) MOUNT FOR CABLE HARNESS

(71) Applicant: AIRBUS OPERATIONS LIMITED, Bristol (GB)

(72) Inventors: Lawrence Blakeley, Bristol (GB); Craig Spark, Bristol (GB); Jamie Skorczewski, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 14/077,825

(22) Filed: Nov. 12, 2013

(65) Prior Publication Data
US 2014/0131528 A1    May 15, 2014

(30) Foreign Application Priority Data
Nov. 12, 2012 (GB) .................... 1220289.1

(51) Int. Cl.
*F16L 3/08* (2006.01)
*F16L 3/12* (2006.01)
(Continued)

(52) U.S. Cl.
CPC ............. *F16L 3/13* (2013.01); *B60R 16/0215* (2013.01); *H02G 3/32* (2013.01); *F16L 3/00* (2013.01);
(Continued)

(58) Field of Classification Search
CPC ................. F16L 3/04; F16L 3/10; F16L 3/13; F16L 3/14; F16L 2/24; F16L 3/137; F16L 3/233; F16L 3/00; F16L 3/08; H02G 3/32; H02G 3/30; H02G 3/26; H02G 3/0437; H02G 3/22
(Continued)

(56) References Cited

U.S. PATENT DOCUMENTS 3,515,363 A * 6/1970 Fisher .......................... 248/71
3,582,030 A * 6/1971 Barrett, Jr. ................ F16L 3/12
248/68.1
(Continued)

FOREIGN PATENT DOCUMENTS

CN      102348864    2/2012
DE      1 690 540    5/1971
(Continued)

OTHER PUBLICATIONS

UK Search Report for GB Application No. 1220289.1, dated Mar. 12, 2013, Rhys J. Williams, 1 page.
(Continued)

*Primary Examiner* — Brian Mattei
*Assistant Examiner* — Taylor Morris
(74) *Attorney, Agent, or Firm* — Nixon & Vanderhye P.C.

(57) ABSTRACT

The present application relates to a mount (10) for mounting a cable harness to a support. The mount (10) comprises a harness receiving portion (42), and a fastener attachment portion (80) from which a fastener for securing the mount (10) to a support is extendable. The mount (10) orientates a fastener extending from the fastener attachment portion (80) to extend about the harness receiving portion (42) to secure a cable harness to the mount (40) when the mount is secured to a support by the fastener. The present application also relates to a mount assembly and a method of mounting a cable harness to a support.

21 Claims, 4 Drawing Sheets

(51) Int. Cl.
*F16L 3/13* (2006.01)
*H02G 3/32* (2006.01)
*B60R 16/02* (2006.01)
*F16B 15/00* (2006.01)
*F16B 45/00* (2006.01)
*F16L 3/24* (2006.01)
*F16L 3/00* (2006.01)
*H02G 3/30* (2006.01)
*F16L 3/02* (2006.01)
*F16L 3/04* (2006.01)
*H02G 3/22* (2006.01)

(52) U.S. Cl.
CPC ... *F16L 3/02* (2013.01); *F16L 3/04* (2013.01); *F16L 3/08* (2013.01); *H02G 3/22* (2013.01); *H02G 3/30* (2013.01)

(58) Field of Classification Search
USPC .......... 248/71, 72, 74.3, 74.4, 74.5, 73, 74.1, 248/74.2
See application file for complete search history.

(56) References Cited

U.S. PATENT DOCUMENTS

| | | | | |
|---|---|---|---|---|
| 3,807,675 | A * | 4/1974 | Seckerson | F16L 3/13 24/337 |
| 3,971,105 | A * | 7/1976 | Caveney | 24/16 PB |
| 4,244,544 | A * | 1/1981 | Kornat | F16L 3/13 248/68.1 |
| 4,779,828 | A * | 10/1988 | Munch | 248/74.3 |
| 5,131,613 | A | 7/1992 | Kamiya et al. | |
| 5,215,281 | A | 6/1993 | Sherman | |
| 5,354,021 | A * | 10/1994 | Farrell | 248/74.3 |
| 5,704,574 | A * | 1/1998 | Kasubke | 248/74.3 |
| 5,810,305 | A * | 9/1998 | Heard | G09F 7/18 248/218.4 |
| 7,114,686 | B2 * | 10/2006 | Andrigo | 248/71 |
| 7,284,731 | B1 * | 10/2007 | Johnson et al. | 248/74.4 |
| 7,621,488 | B2 * | 11/2009 | Miller | 248/71 |
| 7,861,981 | B2 * | 1/2011 | Olver | 248/68.1 |
| 2002/0088905 | A1 * | 7/2002 | Hansen | 248/65 |
| 2004/0026577 | A1 | 2/2004 | Yasuda et al. | |
| 2010/0006709 | A1 * | 1/2010 | Bleus | F16L 3/1025 248/68.1 |
| 2010/0096511 | A1 | 4/2010 | Olver | |

FOREIGN PATENT DOCUMENTS

| | | |
|---|---|---|
| DE | 26 24 968 | 12/1977 |
| EP | 0722062 | 7/1996 |
| EP | 2 141 397 | 1/2010 |
| GB | 2 404 420 | 2/2005 |
| WO | 2008/061739 A1 | 5/2008 |
| WO | WO 2011018605 A1 * | 2/2011 |

OTHER PUBLICATIONS

Extended European Search Report dated Mar. 27, 2014 in EP 13191837.7.
Office Action in Chinese Patent Application No. 201310560326.5 dated Aug. 17, 2016, with English Translation, 13 pages.
Search Report in Chinese Patent Application No. 201310560326.5 dated Aug. 8, 2016, with English Translation, 4 pages.

* cited by examiner

MOUNT FOR CABLE HARNESS

This application claims priority to UK Application No. 1220289.1 filed Nov. 12, 2012, the entire contents of which is hereby incorporated by reference.

TECHNICAL FIELD

The invention relates to a mount for mounting a cable harness to a support. The present invention also relates to a mount assembly and a method of mounting a cable harness to a support.

BACKGROUND TO THE INVENTION

A cable harness is an assembly of cables or wires. The cables or wires generally transmit electrical power and/or electrical or optical signals.

Cable harnesses are commonly used in aircraft, other vehicles and machinery. They provide a means of routing a plurality of cables through an aircraft structure. A cable harness, also known as a wire harness, cable assembly, wiring assembly or wiring loom, comprises a plurality of cables or wires. The cables may be bound together by one or more straps, sleeves, or the like.

There is a need to mount a cable harness to a support, which may form part of the structure of an aircraft, other vehicle or machinery, to secure the cable harness in position along part or all of its length. By mounting the cable to a support it is possible to restrict movement of the cable. This aids against the adverse effects of vibrations, abrasions and prevents the cables from become trapped by moving parts.

It is known to use clamps to mount a cable harness to one or more. To mount a harness to a support, the harness is generally mounted to the clamp and the clamp is then mounted to the support. This may be time consuming. Such an arrangement also commonly uses a bolt attachment to mount the clamp to a support. However, this requires the use of a number of components, for example a bolt, washers, a nut and/or an anchor nut with rivets.

Furthermore, a direct line of access may be required to engage a tool with the bolt to affix the mount to the support. Such access may be difficult. Similar problems will recur throughout the life of the aircraft during maintenance and repair.

In some situations one or more clamps are know to fail which may result in damage to the cable harness, the structure or other systems if contact is made.

SUMMARY OF THE INVENTION

According to one aspect of the invention, there is provided a mount for mounting a cable harness to a support comprising a harness receiving portion, and a fastener attachment portion from which a fastener for securing the mount to a support is extendable, wherein the mount is configured to orientate a fastener extending from the fastener attachment portion to extend about the harness receiving portion to secure a cable harness to the mount when the mount is secured to a support by the fastener.

The harness receiving portion may be a recess in which a cable harness is at least partially receivable.

The fastener attachment portion may be configured to orientate the fastener to extend over the harness receiving portion to secure the cable harness to the harness receiving portion.

The fastener attachment portion may comprise two fastener receiving parts between which at least a section of the fastener is receivable such that the fastener is extendable over the fastener receiving portion.

Each fastener receiving part may be an aperture formed in the mount through which the fastener is extendable.

The mount may further comprise a harness attachment for securing a cable harness to the mount, such that the harness attachment is configured to act as a first harness securing means, with the fastener acting as a second harness securing means when the mount is secured to a support by the fastener.

The fastener may be a Velcro® type securing mechanism.

The harness attachment may comprise a tie-wrap securing arrangement.

The harness attachment may comprise at least one resilient portion configured to urge the harness against an opposing side of the harness receiving portion.

The harness attachment may further comprise a converging mouth configured to guide a cable harness to an opening to the harness receiving portion.

The mount may further comprise a guide configured to orientate the fastener to extend over the harness receiving portion to secure the cable harness to the harness receiving portion.

The mount may further comprise a support attachment for securing the mount to a support, such that the support attachment is configured to act as a first mount securing means, with the fastener acting as a second mount securing means when the mount is secured to the support by the fastener.

The support attachment may comprise two attachment elements spaced from each other.

The support attachment may comprise a releasable clip.

According to another aspect of the invention, there is provided a mount assembly comprising a mount according to any of claims 1 to 11 and a fastener.

The fastener may be permanently mounted to the mount.
The fastener may be integrally formed with the mount.
The fastener may be detachable from the mount.
The fastener may have an elongate flexible tape.
The fastener may be a Velcro type securing mechanism.
The fastener may be a tie-wrap.

According to another aspect of the invention, there is provided a method of attaching a cable harness to a support comprising receiving a cable harness in a harness receiving portion of a mount, locating the mount against a support, extending a fastener about the support, and extending the fastener about the harness receiving portion to secure a cable harness to the mount when the fastener secures the mount to a support.

BRIEF DESCRIPTION OF THE DRAWINGS

Embodiments of the invention will now be described, by way of example only, with reference to the accompanying drawings, in which.

DETAILED DESCRIPTION

Referring to FIGS. 1 to 4, a mount assembly 10 is shown. The mount assembly or cable harness mount assembly 10 is shown mounting a cable harness 20 to a support 30.

Figure 1:
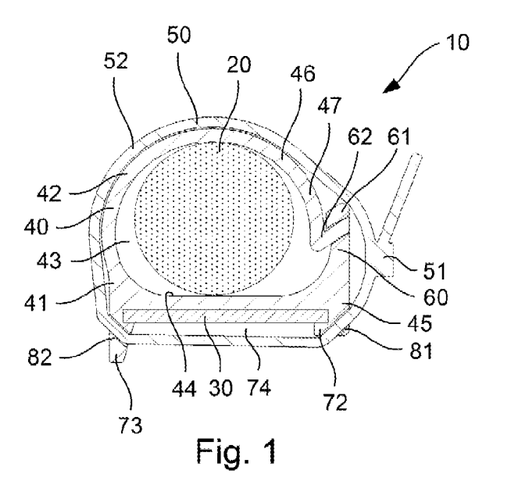
FIG. 1 shows a schematic cross-sectional side view of a cable harness mount assembly with a cable harness mount and a cable tie mounting a cable harness to a support.

The cable harness 20, also known as a wire harness, cable assembly, wiring assembly or wiring loom, comprises a plurality of cables or wires. The cables may be bound together by one or a number of straps, sleeves, or the like. Alternatively, one or more cable harness mount assemblies 10 may be used to bind the cables together.

The support 30 is shown as a bracket, however it will be understood that the support 30 is not limited thereto and may have an alternative arrangement. The support 30 in the present arrangement forms part of an aircraft structure, although it will be understood that the support may form part of another type of vehicle, machinery or structure.

The cable harness mount assembly 10 comprises a mount 40, acting as a cable harness mount, and a tie-wrap 50. The tie-wrap 50, also known as a cable tie or a zip tie, acts as a fastener. The tie-wrap 50 acts to secure the cable harness mount 40 to the support 30. Although the fastener described herein as a tie-wrap, it will be understood that the fastener is not limited thereto and that an alternative fastener may be used. For example, a Velcro type securing arrangement may be used. The fastener may be flexible and elongate.

The tie-wrap 50 is conventional and so a detailed description will be omitted herein. The tie-wrap 50 comprises a head 51 and a tape section 52. The tape section 52 extends from the head 51. The tape section 52 has a series of teeth (not shown) along its length. The teeth slope in one direction. The head 51 has a passage and a ratchet (not shown) in the passage. The ratchet engages the teeth when the tape section 52 extends through the passage to retain the tie-wrap in a locked position.

Figure 2:
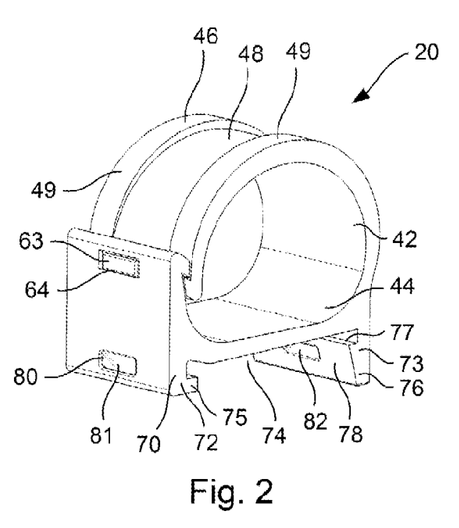
FIG. 2 shows a perspective view of the cable harness mount shown in FIG. 1.
Figure 3:
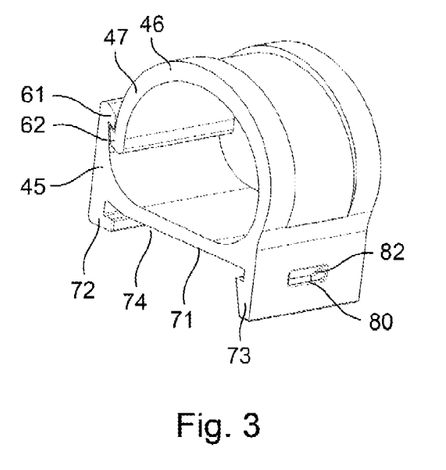
FIG. 3 shows another perspective view of the cable harness mount of FIG. 2.
Figure 4:
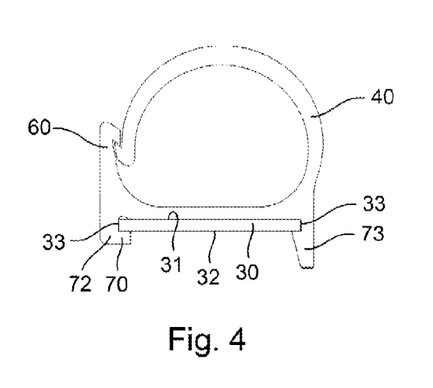
FIG. 4 shows a side view of the cable harness mount of FIG. 2 with the support shown in a mounted position.

The cable harness mount 40 has a mount body 41. The mount body 41 has a harness receiving portion 42. The harness receiving portion 42 forms a recess or harness receiving space 43 in the mount body 41 in which the cable harness 20 is receivable. The recess 43 may be a channel. In the present embodiment, a section of the cable harness 20 is fully received by the harness receiving portion 42. Alternatively, part of the section of the cable harness 20 protrudes out of or away from the harness receiving portion 42.

The harness receiving portion 42 has a harness receiving surface 44 against which the cable harness 20 is configured to locate. The harness receiving portion 44 has a second part 45 and a second part 46. The second part 46 is movable relative to the second part 45. That is, in the present arrangement, the second part 46 is deformable relative to the first part 45. The second part 46 is able to deflect relative to the first part. In the present arrangement, the first and second parts 45, 46 of the harness receiving portion 44 are integrally formed. The second part 46 is able to deform, whilst the first part retains rigidity. The cable harness mount 40 is formed from a moulded plastic, however it will be understood that other suitable materials may be used. In addition, the arrangement could be such that the first part 45 is flexible and the second part 46 is held rigid due to rigidity of the harness 20.

Although in the present arrangement the second part 46 is integrally formed with the first part 45 of the harness receiving portion 44, it will be understood that in an alternative arrangement the second part may be a separate element. The second part 46 may be hinged about the first part 45.

The first and second parts 45, 46 of the harness receiving portion 42 diverge away from each other to define the recess 43 therebetween. The second part 46 has a free end 47 which is movable relative to the first part 45.

The free end 47 of the second part 46 of the harness receiving portion 42 is positionable to be spaced from the first part 45. Therefore, it is possible to form an opening between the free end 47 of the second part 46 and the first part 45. The second part 46 is resilient. That is the free end of the second part 46 is biased away from the first end 45. The free end 47 of the second part 46 is positionable to abut the first part 45 of the cable harness mount 40. In an alternative embodiment, the free end of the second part may be permanently spaced from the first part such that an opening is permanently formed in the harness receiving portion 42 between the first and second parts.

The cable harness mount 40 further comprises a harness attachment 60. The harness attachment 60 acts as a first harness securing means or unit. That is, the harness attachment 60 retains the cable harness 20 in a secured condition with the cable harness mount 40. The tie-wrap 50 acts as a second harness securing means, as will become apparent hereinafter. In the arrangement shown in FIGS. 1 to 4, the harness attachment 60 retains the free end 47 of the second part 46 of the harness receiving portion 44 in engagement with the first part 45. The harness attachment 60 has a first engaging section 61 on the first part 45 of the harness receiving portion 44. The harness attachment 60 also has a second engaging section 62 on the free end 47 of the second part 46 of the harness receiving portion 44. The first engaging section 61 is configured to be brought together with the second engaging section 62 to retain the harness attachment 60 in an engaged condition.

In the present embodiment, the harness attachment 60, acting as the first harness securing means, is a clasp. The clasp has a first hook forming the first engaging section 61 and a second hook forming the second engaging section 62. The first and second hooks oppose each other and latch over each other when they are brought together. When the first and second hooks latch over each other, the free end 47 of the second part 46 is fixedly engaged with the first part 45.

The free end 47 of the second part 46 of the harness receiving portion 44 is biased away from the first part 47. Therefore, when the first and second hooks overlap the second hook 62 is urged into engagement with the first hook 61. In an arrangement in which the free end of the second part is permanently spaced from the first part such that an opening is permanently formed in the harness receiving portion 42 between the first and second parts it will be understood that the rigidity of the second part 46 provides a level of mechanical retention of the harness 20. That is, the second part 46 acts as a harness attachment.

The second engaging section 62 has an engaging nub 63 extending from its end. The engaging nub 63 is locatable in an engaging hole 64 formed in the first engaging section 61. The engaging hole 64 extends through the first engaging section to its outer surface. The engaging nub 63 further maintains the harness attachment 60 in the engaged condition when the first and second engaging sections 61, 62 are brought together.

The cable harness mount 40 has a guide channel 48. The guide channel 48 is formed on an outer surface of the cable harness mount 40. The guide channel 48 on the cable harness mount 40 acts as a guide. That is, the guide channel 48 acts to orientate the path of the tie-wrap 50 over the cable harness mount 40 when the tie-wrap 50 is attached to the cable harness mount 40. The guide channel 48 is configured to guide the tie-wrap 50 over the harness receiving portion 44. In the present arrangement, the guide channel 48 is formed on the second part 46 of the harness receiving portion 42, although it will be understood that the arrangement of the guide is not limited thereto. The guide channel 48 is formed by two guide ribs 49. The guide ribs 49 extend parallel to, but spaced from, each other along at least part of the outer face of the cable harness mount 40.

The guide channel 48 retains the tie-wrap 50, acting as a fastener, in position when the tie-wrap 50 is attached to the cable harness mount 40. It will be understood that in some arrangements the guide channel 48, acting as a guide, may be omitted.

The cable harness mount 40 also has a support attachment 70. The support attachment 70 acts as a first mount securing means or unit. That is, the support attachment 70 acts to retain the cable harness mount 40 in a secured condition with the support 30. The tie-wrap 50 acts as a second mount securing means, as will become apparent hereinafter. In the arrangement shown in FIGS. 1 to 4, the support attachment 70 attaches to the support 30.

Figure 5:
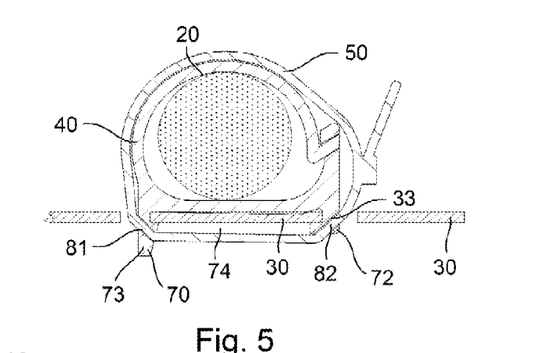
FIG. 5 shows a cross-sectional side view of the cable harness mount assembly of FIG. 1 mounted to an alternative support.

It will be understood that the arrangement of the support attachment may be dependent on the arrangement of the support 30 against which the cable harness mount 40 is to be attached. In FIG. 1, the support 30 is shown as a plate. The plate has an upper face 31, a lower face 32 and two edges 33 that extend parallel, but spaced from each other. Although the edges 33 are shown as the edges of the plate in FIG. 1, it will be understood that the edges 33 of the support may be inside edges of one or more apertures formed in the support 30. Such an arrangement is shown in FIG. 5.

The cable harness mount 40 has a base 71. The base 71 is configured to lie against the support 30. The support attachment 70 is on the base 71. The support attachment 71 has first and second attachment elements 72, 73 on the base 71. The first and second attachment elements 72, 73 are spaced from each other along the base 71.

The first attachment element 72 protrudes from the base 71 at one end. The second attachment element 73 protrudes from the base 71 at an opposing end. A support receiving space 74 is formed therebetween. The first attachment element 72 has a lip 75 extending substantially parallel to the base 71. The lip 75 protrudes into the support receiving space 74. The second attachment element 73 has a tab 76 with a shoulder 77. The shoulder 77 extends substantially parallel to the base 71. The tab 76 has an inclined face 78 extending at an oblique angle to the base 71. The first and second attachment elements 72, 73 are configured to receive the or part of the support 30 therebetween. The support attachment 70 acts as a releasable clip.

The cable harness mount 40 also has a fastener attachment portion 80. The fastener attachment portion 80 comprises first and second tie-wrap receiving apertures 81, 82. The tie-wrap receiving apertures 81, 82 act as fastener receiving parts. That is, the tie-wrap 50 is receivable in each of the first and second fastener receiving parts.

The fastener attachment portion 80 also acts as a fastener guide. That is, the tie-wrap receiving apertures 81, 82 act to align the path of the tie-wrap 50 about the cable harness mount 40. The tie-wrap receiving apertures 81, 82 are configured to orientate the tie-wrap extending therefrom.

The tie-wrap receiving apertures 81, 82 are spaced from each other on opposing sides of the harness receiving portion 42. Therefore, a tie-wrap 50 received by both receiving apertures 81, 82 will extend over the harness receiving portion 42 between the two apertures 81, 82.

The tie-wrap receiving apertures 81, 82 extend through the cable harness mount 40. In the present embodiment the first tie-wrap receiving aperture 81 extends from one side of the cable harness mount body 41 to a lower end of the first attachment element 72. The second tie-wrap receiving aperture 82 extends from the other side of the cable harness mount body 41 to a lower end of the second attachment element 73.

To mount the cable harness 20 to the support 30, the harness 20 is received in the harness receiving space 43 defined by the harness receiving portion 42. The harness 20 is inserted into the space 43 through the opening formed between the free end 47 of the second part 46 and the first part 45 of the harness receiving portion 43 by deforming the second part 46 relative to the first part 45. Once the harness 20 is received by the harness receiving portion 42, the free end 47 of the second part 46 is urged towards the first part 45. The harness attachment 60 retains the free end 47 of the second part 46 of the harness receiving portion 44 in engagement with the first part 45. The second engaging section 61 on the free end 47 of the second part 46 locates over and engages with the first engaging section 61 of the first part 45. The harness attachment 60 is then in an engaged condition.

At this stage the harness 20 is secured to the cable harness mount 40 by the harness attachment 60, acting as the first harness securing means. The cable harness mount 40 is then brought towards the support 30. It will be understood that the cable harness mount 40 may be brought together with the support 30 prior to the harness 20 being brought together with the cable harness mount 40.

When the cable harness mount 40 is brought together with the support 30, the first attachment element 72 is brought into abutment with one edge 33 of the support 30. The edge 33 is received in the gap formed between the lip 75 of the first attachment element 72 and the base 71. The lip 75 locates against the lower face 32 of the support 30. The cable harness mount 40 is then rotated relative to the support 30 to bring the base 71 towards the support 30. It will be understood that the distance between the first and second attachment elements 72, 73 corresponds to the width of the support 30 between the opposing edges 33. As the cable harness mount 40 is rotated the second attachment element 73 is also brought towards the support 30. The second attachment element 73 locates over the other edge 33 of the support 30. As the cable harness mount 40 is further urged towards the support 30, the inclined face 78 of the second attachment element tab 76 abuts against the other edge 33. The tab 76 acts on an edge and is biased outwardly. The shoulder 77 of the second attachment element 73 then locates over the lower face 32 of the support 30. The cable harness mount 40 is then secured to the support 30 by the support being disposed between the base 41, the lip 75 of the first attachment element 72 and the shoulder 77 of the second attachment element 73. The base 71 may be slightly convex so that when the clip 76 is pushed into position the resilience of the cable harness mount 40 is utilised to achieve a positive engagement of cable harness mount 40 to the support 30.

At this stage the cable harness mount 40 is secured to the support 30 by the support attachment 70, acting as the first mount securing means. With this arrangement a user is able to let go of the cable harness mount 40 and the harness 20 whilst preparing to attach the tie-wrap 50. It will be understood that with the above arrangement of the support attachment, having at least two attachment elements 72, 73, it is possible to determine the correct orientation of the mount 40 on the support 30. Therefore, the mount 40 is restricted from moving relative to the harness 20 and support 30.

The tie-wrap 50, acting as a fastener, is then passed through one of the tie-wrap receiving apertures 81, 82. For example, the tie-wrap 50 is received through the first receiving aperture 81, passing over the support receiving space 74 and received through the second receiving aperture 82 on the opposing side of the cable harness mount 40. The tie-wrap receiving apertures 81, 82 align the path of the tie-wrap 50 so that a section of the tie-wrap 50 extends over the support receiving space 74. The support 30 is then disposed between the base 71 of the cable harness mount 40 and a section of the tie-wrap 50 extending between the tie-wrap receiving apertures 81, 82.

The tie-wrap 50 is then passed over the cable harness mount 40 so that it extends around the harness receiving portion 42. That is, the tie-wrap 50 passes over the first and second parts 45, 46 of the harness receiving portion 42. The end of the tape section 52 of the tie-wrap 50 is engaged with the tie-wrap head 51. Therefore, the tie-wrap 50 is locked. The tie-wrap 50 is drawn into its locked position with the head 51 passing along the tape section 52 and being prevented from sliding in the opposite direction.

The tie-wrap receiving apertures 81, 82 align the path of the tie-wrap 50 so that a section is enabled to extend about the harness receiving portion 42. When the tie-wrap 50 is drawn tight around the cable harness mount 40, the tie-wrap 50 restricts the second part of the harness receiving portion 42 from moving away from the first part 45. The harness 20 is then disposed between at least a section of the cable harness mount 40 and a section of the tie-wrap 50 extending between the tie-wrap receiving apertures 81, 82.

The arrangement of the cable harness mount 40 enables the tie-wrap 50 to be used as a means of securing the mount 40 to the support 30 as well as the harness 20 to the mount 40. This means that the number of components required are minimised.

As previously explained, mounting of a cable harness to a support is problematic because of the difficulty in attaching the cable harness mount to both the cable harness and the support. Furthermore, conventional cable harness mounts use a bolt arrangement which requires a large number of components.

To overcome the problems associated with mounting the cable harness to a support, the cable harness mount 40 enables the tie-wrap to provide both functions of attaching the cable harness mount to the cable harness and the support to the cable harness mount. Therefore, the installation process is simplified and installation time is minimised. For example, it is not necessary to provide a direct line of access as a tool is no longer required to tighten the fastener. By minimising the number of components required, the weight of the cable harness mount is minimised.

As described above, the cable harness mount 40 is secured to the support 30 by the tie-wrap 50, acting as the second support securing means. Therefore, the tie-wrap 50 prevents detachment of the mount from the support should the support attachment 70 fail. Similarly, the clip, acting as the support attachment, prevents detachment of the mount from the support should the tie-wrap 50 fail. This provides a level of redundancy against failure of one of the tie-wrap or clip.

The cable harness 20 is secured to the mount 40 by the tie-wrap 50, acting as the second mount securing means. Therefore, the tie-wrap 50 prevents detachment of the cable harness 20 from the support should the harness attachment 60 fail. Similarly, the clasp, acting as the harness attachment, prevents detachment of the harness 20 from the cable harness mount 40 should the tie-wrap 50 fail. This provides a level of redundancy against failure of one of the tie-wrap or clasp.

Although in the above described embodiment the harness attachment 60, acting as the first harness securing means, is formed by a clasp, it will be understood that alternative arrangements are envisaged. For example, in an alternative embodiment the harness attachment 60, acting as the first harness securing means, is formed by two flexible elements which extend from the mount body 41 and are joined at their free end to extend around a harness. With such an arrangement, the two flexible elements form first and second parts of the harness receiving portion. Such flexible elements may be straps. A first engaging section is formed at the end of the first flexible element, and a second engaging section may be formed at the end of the second flexible element. The first and second engaging sections are formed by corresponding Velcro type securing mechanism parts. When a harness is received by the harness receiving portion, the straps are brought around the harness and are engaged with each other by the Velcro type securing mechanism parts to act as the first harness securing means. The tie-wrap may then be disposed to extend over the straps, around the harness receiving portion, to act as the second harness securing means.

In the above described embodiments the cable harness mount assembly has two harness securing means, namely the harness attachment 60 and the tie-wrap 50. Similarly, the cable harness mount assembly has two mount securing means, namely the support attachment 70 and the tie-wrap 50. However, it will be understood that in an alternative arrangement one or both of the harness attachment 60 and support attachment 70 may be omitted. In such an arrangement, the tie-wrap acts as the harness securing means and/or support securing means. For example, the harness attachment 60 and the support attachment 70 may be omitted. With such an arrangement, the tie-wrap 50, acting as a fastener, is used to perform the function of securing the cable harness to the cable harness mount as well as performing the function of securing the mount to the support without any additional attachment means. Therefore, attachment of the harness to the support is simplified.

Figure 6:
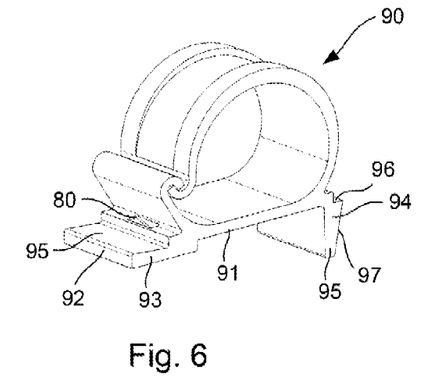
FIG. 6 shows a perspective view of a cable harness mount according to another embodiment.

Although one arrangement of the support attachment is described above, it will be understood that alternative arrangements may be used. One such arrangement is shown in FIG. 6. This embodiment is generally the same as the above described embodiments, however in this embodiment the arrangement of the support attachment differs. As features and components of this embodiment are generally the same as the embodiments described above, a detailed description will be omitted herein. Furthermore, it will be understood that features and components correspond to features and components described above and that different features may be used interchangeably.

In the arrangement shown in FIG. 6, a cable harness mount 90 has a base 91. The base 91 is arranged to lie against the support (not shown in FIG. 6). A support attachment 92 is on the base 91. The support attachment 92 has first and second attachment elements 93, 94 on the base 91. The first and second attachment elements 93, 94 are spaced from each other along the base 91 with a support receiving space formed therebetween. The first attachment element 93 has a lip 95 protruding outwardly, but offset, from the base 91. The second attachment element 94 has a tab 95 with a shoulder 96. The tab 95 has an inclined face 97 extending at an oblique angle to the base 91. The support attachment 92 acts as a releasable clip.

When the cable harness mount 90 is brought together with the support, the first attachment element 93 is inserted through a corresponding hole formed in the support (not shown in FIG. 6). The cable harness mount 90 is then rotated relative to the support to bring the base 91 towards the support. As the cable harness mount is rotated the lip 95 comes into contact with the lower side of the support. The second attachment element 94 is also brought towards the support and is received in a corresponding hole. The cable harness mount 90 is urged towards the support, and the inclined face 97 of the tab acts on an edge of the corresponding hole to bias the second attachment element 94. The shoulder 96 then locates over the lower side of the support, and the support is secured between the base 91, the lip 95 of the first attachment element 93 and the shoulder 96 of the second attachment element 94.

Although in the above described embodiments the fastener attachment portion is formed by two fastener receiving apertures acting as fastener receiving parts, it will be understood that the arrangement is not limited thereto. For example, in one arrangement the cable harness mount may comprise a single fastener receiving part, or more than two fastener receiving parts. Furthermore, one or more fastener receiving parts may be formed as one or cut-outs or recesses formed in the outer surface of the cable harness mount in which the tie-wrap acting as a fastener may be receivable.

Figure 7:
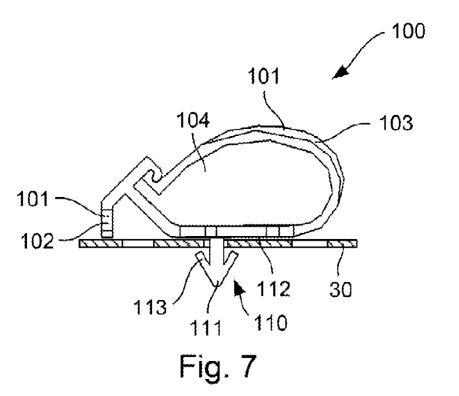
FIG. 7 shows a schematic cross-sectional side view of a cable harness mount according to another embodiment on a support.

One such alternative embodiment of a cable harness mount is shown in FIG. 7. This embodiment is generally the same as the above described embodiments, however in this embodiment the arrangement of the fastener attachment portion differs. As features and components of this embodiment are generally the same as the embodiments described above, a detailed description will be omitted herein. Furthermore, it will be understood that features and components correspond to features and components described above and that different features may be used interchangeably.

In FIG. 7, the fastener attachment portion 101 of the cable harness mount 100 comprises a tie-wrap receiving aperture 102 which acts as a first fastener receiving part. The fastener attachment portion 101 also comprises a guide channel 103 which acts as a second fastener receiving part. The guide channel 103 is formed on the outer surface of the fastener attachment portion 101. Therefore, it will be understood that a tie-wrap (not shown in FIG. 7) is receivable in each of the fastener receiving parts. As with the previous embodiments, the fastener attachment portion also acts as a fastener guide. That is, they are configured to orientate the tie-wrap received therein. As with the preceding embodiments, the fastener attachment portion 101 acts as a first harness securing means or unit. That is, the fastener attachment portion 101 acts to retain the harness in a secured condition with the support 30. A tie-wrap (not shown in FIG. 7) then acts as a second harness securing means, as will become apparent hereinafter.

The tie-wrap receiving aperture 102 is spaced from the guide channel 103 on opposing sides of a harness receiving portion 104. Therefore, a tie-wrap received by both the receiving aperture 102 and the guide channel 103 will extend over the harness receiving portion 104.

Furthermore, the cable harness mount 100 shown in FIG. 7 has a different support attachment 110. As with the preceding embodiments, the support attachment 110 acts as a first mount securing means or unit. That is, the support attachment 110 acts to retain the cable harness mount 100 in a secured condition with the support 30. A tie-wrap (not shown in FIG. 7) then acts as a second mount securing means. In the present embodiment the support attachment 110 comprises first and second harpoon retainers in (only one is shown in FIG. 7). The harpoon retainers in extend from a base 112 of the cable harness mount 100. The harpoon retainers 111 are spaced from each other on the base 112. The first harpoon retainer 111 acts as a first attachment element and the second harpoon retainer acts as a second attachment element.

When the cable harness mount 100 is positioned against the support 30, the harpoon retainers 111 are received in corresponding holes formed in the support 30. Arms 113 of the harpoon retainers in play outwardly to abut against the lower side of the support to retain the cable harness mount 100 in position on the support 30. It will be understood that the use of two or more harpoon retainers 111, acting as attachment elements, ensure that the cable harness mount 100 is correctly orientated on the support 30.

In the above described embodiments, the tie-wrap 50 is receivable in one or more fastener receiving parts to attach the cable tie 50 to the cable harness mount 40. One advantage of the above described embodiments is that the tie-wrap may be easily released by cutting the tie-wrap. Thereafter, the cable harness mount may be reused. However, in another embodiment, a tie-wrap, acting as a fastener may be fixedly mounted to the cable harness mount 100, as will be explained below. One advantage of the embodiments described above with reference to FIGS. 1 to 7 is that the cable harness to cable harness mount connection is provided with redundancy against failure. As such, the harness attachment acts as a first harness securing means to secure the harness to the cable harness mount. The tie-wrap then acts as a second harness securing means when the tie-wrap is fixedly mounted about the cable harness mount. Therefore, if one of the harness securing means fails, for example the clasp shown in FIGS. 1 to 4 or the tie-wrap, then the other harness securing means will retain the harness to the cable harness mount in a secured condition without failure of the connection occurring.

Similarly, the support attachment acts as a first mount securing means to secure the cable harness mount to the support. The tie-wrap then acts as a second mount securing means when the tie-wrap is fixedly mounted about the support. Therefore, if one of the mount securing means fails, for example the clip shown in FIGS. 1 to 4 or the tie-wrap, then the other mount securing means will retain the support to the cable harness mount in a secured condition without failure of the connection occurring.

This redundancy against failure of each connection ensures that the cable harness will not become detached from the support.

As described above, in an alternative arrangement the harness attachment and support attachment may be omitted. In such an arrangement, the tie-wrap acts as the harness securing means and support securing means. With such an arrangement, the tie-wrap 50, acting as a fastener, is used to perform the function of securing the cable harness to the cable harness mount as well as performing the function of securing the mount to the support without any additional attachment means. Therefore, attachment of the harness to the support is simplified. Such an embodiment is shown in FIGS. 8 and 9.

Figure 8:
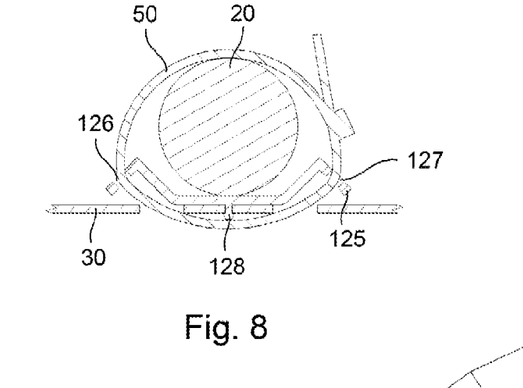
FIG. 8 shows a schematic cross-sectional side view of a cable harness mount assembly according to another embodiment.
Figure 9:
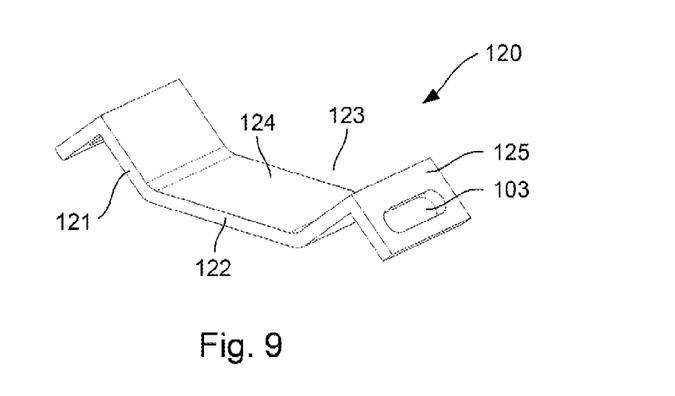
FIG. 9 shows a perspective view of the cable harness mount shown in FIG. 8.

Referring to FIGS. 8 and 9, a cable harness mount 120 is shown having a mount body 121. The mount body 121 has a harness receiving portion 122. The harness receiving portion 122 forms a recess or harness receiving space 123 in the mount body 121 in which the cable harness 30 is receivable. In the present embodiment, a section of the cable harness 20 protrudes out of or away from the harness receiving portion 122.

The harness receiving portion 122 has a harness receiving surface 124 against which the cable harness 20 is configured to locate. The cable harness mount 120 also has a fastener attachment portion 125. The fastener attachment portion 125 comprises first and second tie-wrap receiving apertures 126, 127. The tie-wrap receiving apertures 126, 30127 act as fastener receiving parts. That is, the tie-wrap 50 is receivable in each of the first and second fastener receiving parts. The fastener attachment portion 125 also acts as a fastener guide. That is, the tie-wrap receiving apertures 126, 127 act to align the path of the tie-wrap 50 about the cable harness mount 40. The tie-wrap receiving apertures 126, 127 are configured to orientate the tie-wrap extending therefrom.

The tie-wrap receiving apertures 126, 127 are spaced from each other on opposing sides of the harness receiving portion 122. Therefore, a tie-wrap 50 received by both receiving apertures 126, 127 will extend over the harness receiving portion 122 between the two apertures 126, 127.

To mount the cable harness 20 to the support 30, the harness 20 is at least partially received in the harness receiving space 123 defined by the harness receiving portion 122. The mount 120 is brought together with the support 30. A small spigot 128, acting as a locating element, is disposed in a corresponding hole in the support 30.

The tie-wrap 50, acting as a fastener, is then passed through one of the tie-wrap receiving apertures 126, 127. For example, the tie-wrap 50 is received through the first receiving aperture 126, passing over the support and is received through the second receiving aperture 127 on the opposing side of the cable harness mount 120. The tie-wrap receiving apertures 126, 127 align the path of the tie-wrap 50 so that the support is received between a section of the tie-wrap 50 and the cable harness mount 120. The support 30 is then disposed between the base of the cable harness mount 120 and a section of the tie-wrap 50 extending between the tie-wrap receiving apertures 126, 127.

The tie-wrap 50 is then passed over the cable harness mount 120 so that it extends around the harness receiving portion 122. That is, the tie-wrap 50 passes over, and locates against, the harness 20 in the harness receiving portion 122. The tie-wrap 50 is drawn into its locked position. The harness 20 is then disposed between the harness receiving surface 124 and a section of the tie-wrap 50 extending between the tie-wrap receiving apertures 126, 127.

The tie-wrap receiving apertures 126, 127 align the path of the tie-wrap 50 so that a section is enabled to extend about the harness receiving portion 122. The arrangement of the cable harness mount 120 enables the tie-wrap 50 to be used as a means of securing the mount 120 to the support 30 as well as the harness 20 to the mount 120.

In the above described embodiments, the tie-wrap is receivable in one or more fastener receiving parts to attach the cable tie to the cable harness mount. One advantage of the above described embodiments is that the tie-wrap may be easily released by cutting the tie-wrap. Thereafter, the cable harness mount may be reused. However, in another embodiment, a tie-wrap, acting as a fastener may be fixedly mounted to the cable harness mount. With such an arrangement, the tie-wrap may be integrally formed with the cable harness mount body. Therefore, the number of components are minimised.

In an arrangement in which the tie-wrap, acting as a fastener, is fixedly mounted to the cable harness mount, the point of attachment from which the tie-wrap extends forms the or part of the fastener attachment portion. For example, the fastener attachment portion may include the fixing point of the tie-wrap, including the ratchet of the tie-wrap, as a first fastener receiving part, and a tie-wrap receiving aperture as a second fastener receiving part. A section of the fastener would then extend over the fastener receiving portion when the fastener extends between the fastener receiving parts.

Figures 10, 11:
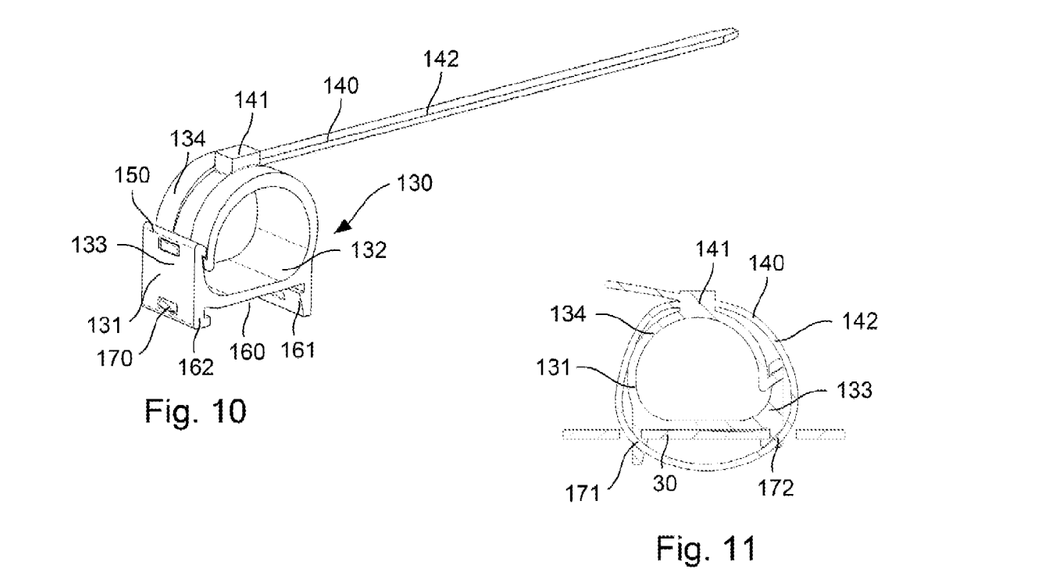
FIG. 10 shows a perspective view of a cable harness mount assembly with a cable harness mount and a cable tie according to another embodiment.
FIG. 11 shows a cross-sectional view of the cable harness mount assembly shown in FIG. 10 mounted to a support.

Referring to FIGS. 10 and 11, an embodiment is shown in which the tie wrap is fixedly mounted to the cable harness mount. This embodiment is generally the same as the above described embodiments, in particular the embodiment shown in FIGS. 1 to 5, however in this embodiment the arrangement of the fastener attachment portion differs. As features and components of this embodiment are generally the same as the embodiments described above, a detailed description will be omitted herein. Furthermore, it will be understood that features and components correspond to features and components described above and that different features may be used interchangeably.

The embodiment shown in FIGS. 10 and 11 has a cable harness mount 130 and a tie-wrap 140, acting as a fastener. A head 141 of the tie wrap 140 is fixedly mounted to the cable harness mount 130. The head 141 is integrally formed with the cable harness mount 130. A tape section 142 extends from the head 141. The tape section 142 has a free end. The tape section 142 has a series of teeth (not shown) along its length. The teeth slope in one direction. The head 141 has a passage and a ratchet (not shown) in the passage. The ratchet engages the teeth when the tape section 142 extends through the passage to retain the tie-wrap 140 in a locked position.

The head 141 of the tie-wrap 140 is on the outer surface of the cable harness mount 130. A mount body 131 of the cable harness mount 130 has a harness receiving portion 132 with a first part 133 and a second part 134. In the present arrangement the head 141 of the tie-wrap 140 is on the second part 134. However, it will be understood that the head 141 of the tie-wrap 140 may be on the first part 133.

To mount a cable harness to the support 30, the harness is received by the harness receiving portion 132. A harness attachment 150, acting as the first harness securing means, is then engaged by bringing the first and second parts 133, 134 together into an engaged condition.

When the cable harness mount 130 is brought together with the support 30, the support 30 is received by a support attachment 160, between first and second attachment elements 161, 162. At this stage the cable harness mount 130 is secured to the support 30 by the support attachment 160, acting as the first mount securing means. With this arrangement a user is able to release the cable harness mount 130 and the harness whilst preparing to attach the tie-wrap. The tie-wrap 140 is already secured to the cable harness mount 130, and so will not be forgotten or misplaced.

The tie-wrap 140, acting as a fastener, is then passed through a first tie-wrap receiving aperture 171 forming part of a fastener attachment portion 170. The fastener attachment portion 170 comprises first and second tie-wrap receiving apertures 171, 172. The tie-wrap 140 is received through the first receiving aperture 171, passing over the support and received through the second receiving aperture 172 on the opposing side of the cable harness mount 130. The tie-wrap receiving apertures align the path of the tie-wrap. The support 30 is then disposed between a base of the cable harness mount 130 and a section of the tie-wrap 140 extending between the tie-wrap receiving apertures 171, 172. It will be appreciated that in an alternative arrangement the head of the tie-wrap may be integrally formed with one of the tie-wrap receiving apertures.

The end of the tape section 142 of the tie-wrap 140 is then engaged with the tie-wrap head 141. Therefore, the tie-wrap 140 is locked. By providing the tie-wrap head 141 on the upper surface of the second part 134 ease of access for engaging the tie-wrap is maximised. The tie-wrap 140 is drawn into its locked position with the head 141 passing along the tape section 142 and being prevented from sliding in the opposite direction.

With the above arrangement, the fastener could not be misplaced or lost. Furthermore, it would be difficult for a user to use the mount without attaching the harness and support using the tie-wrap.

Figure 12:
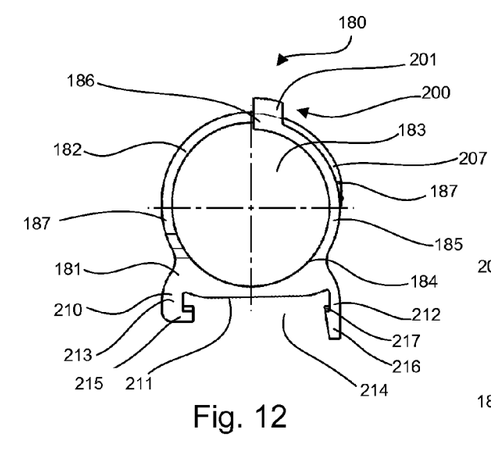
FIG. 12 shows a side view of a cable harness mount according to another embodiment.
Figure 13:
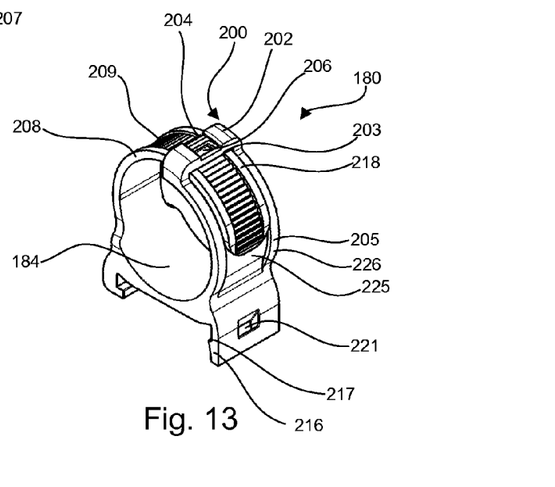
FIG. 13 shows perspective view of the cable harness mount in FIG. 12.

Although one arrangement of the harness attachment is described above, it will be understood that alternative arrangements may be used. One such arrangement is shown in FIGS. 12 and 13. The embodiment is generally the same as the above described embodiments, in particular the embodiment shown in FIGS. 1 to 5, however in this embodiment the arrangement of the harness attachment differs. As features and components of this embodiment are generally the same as the embodiments described above, a detailed description will be omitted herein. Furthermore, it will be understood that features and components correspond to features and components described above and that different features may be used interchangeably.

In the arrangement shown in FIGS. 12 and 13, a cable harness mount 180 has a support attachment 210, and a mount body 181 which has a harness receiving portion 182. The harness receiving portion 182 forms a recess or harness receiving space 183 in the mount body 181 in which a cable harness (not shown in FIGS. 12 and 13) is receivable.

The harness receiving portion 182 has a harness receiving surface 184 against which the cable harness is configured to locate. The harness receiving portion 182 has a first part 185 and a second part 187. The first and second parts 185, 187 are moveable relative to each other. The first and second parts 185, 187 are also deformable and deflect relative to each other. The first and second parts 185, 187 of the harness receiving portion 182 are integrally formed, although alternative arrangements are envisaged.

The first and second parts 185, 187 of the harness receiving portion 182 are located on opposing sides of the cable harness mount 180 and diverge away from each other to define the recess 183 therebetween. The first part 185 has a first free end 186 and the second part 187 has a second free end 188 that are moveable relative to each other.

The cable harness mount 180 further comprises a harness attachment 200. The harness attachment 200 acts as a first harness securing means or unit. That is, the harness attachment 200 retains the cable harness in a secured condition with the cable harness mount 180. A tie-wrap (not shown in FIGS. 12 and 13) acts as a second harness securing means or unit, as will become apparent hereinafter.

In the arrangement shown in FIGS. 12 and 13, the harness attachment 200, acting as the first harness securing means, has a tie-wrap securing arrangement. The harness attachment 200 has a first engaging section 201 located on the first part 185 of the harness receiving portion 182. A second engaging section 207 is located on the second part 187 of the harness receiving portion 182.

The first engaging section 201 of the harness attachment 200 is located on an outer surface at the free end 186 of the first part 185. The first engaging section 201 comprises a head 202 of a tie-wrap securing arrangement. The head 202 of the tie-wrap securing arrangement is on the free end 186 of the first part 185 of the harness receiving portion 182. The head 202 has a passage 203 and a ratchet 206 in the passage 203. The head 202 of the tie-wrap securing arrangement has a guide channel 204 formed centrally on its outer top surface. A tape receiving section 205 is on the first part 185. The tape receiving section 205 comprises a guide channel 225 between two ribs 226 able to guide the second engaging section 207 of the harness attachment 200 and the tie-wrap (not shown) that acts as a further attachment means.

The second engaging section 207 of the harness attachment 200 is located along the outside of the second part 187. The cross section of the second engaging section 207 corresponds to the cross section of the passage aperture 203 in the head 202 attached to the first part 185. The second engaging section 207 comprises a tape section 208 of the tie-wrap securing arrangement that has a series of teeth 209 which slope in one direction. The series of teeth 209 run down the centre of an outside surface of the second part 187 of the harness receiving portion 182. The series of teeth 209 in the tape section 208 of the second part are formed between two ribs 218. The tape section 208 of the tie-wrap securing arrangement is integrally formed with the second part 187 of the harness receiving portion 182. The ratchet 206 in the head 202 of the first part 185 engages the teeth 209 when the tape section 208 extends through the passage 203 to retain the two parts 185, 187 in a locked position.

In the embodiment shown in FIGS. 12 and 13, the support attachment 210, acting as the first support securing means, is a releasable clip, generally the same as the first support securing means shown in FIGS. 1 to 5. As the features and components of the support attachment of this embodiment are generally the same as the embodiment described in reference to FIGS. 1 to 5, a detailed description will be omitted herein, although other embodiments for the support attachment are envisaged.

The cable harness mount 180 has a base 211. The base 211 is configured to lie against the support (not shown). The support attachment 210 is on the base 211. The support attachment 210 has a first attachment element 212 and a second attachment element 213 on the base 211. The first and second attachment elements 212, 213 are spaced from each other along the base 211.

The first attachment element 212 protrudes from the base 211 at one end. The second attachment element 213 protrudes from the base 211 at an opposing end. A support receiving space 214 is formed therebetween. The first attachment element 212 has a tab 216 with a shoulder 217. The shoulder 217 extends substantially parallel to the base 211. The second attachment element 213 has a lip 215 extending substantially parallel to the base 211. The lip 215 protrudes into the support receiving space 214. The first and second attachment elements 212, 213 are configured to receive the or part of the support (not shown) therebetween. The support attachment (210) acts as a releasable clip.

To mount a cable harness (not shown) to the cable harness mount 180, the harness is received by the harness receiving portion 182. The harness attachment 200, acting as the first harness securing means, is then engaged by sliding the tape section 208 of the second part 187 through the passage 203 in the head 202 attached to the first part 185. The harness attachment 200 is adjusted to the correct size by pulling the tape section 208 through the passage 203 in the head 202 until the cable harness is secure.

When the cable harness mount 180 is brought together with the support (not shown), the support is received by the support attachment 210, between the first and second attachment elements 212, 213, in the support receiving space. At this stage the cable harness mount 180 is secured to the support by the support attachment 210, acting as the first mount securing means. With this arrangement the user is able to release the cable harness mount 180 and the harness whilst preparing to attach the tie-wrap (not shown).

The tie wrap, acting as the fastener, is then passed through one of the first and second tie-wrap receiving apertures 221, (receiving aperture not visible in FIGS. 12 and 13). For example, the tie-wrap is received through a first receiving aperture 221, passing over the support receiving space 214 and received through a second receiving aperture (not shown) on the opposing side of the cable harness mount 180. The tie-wrap receiving apertures 221 align the path of the tie-wrap. The support 180 is then disposed between the base 211 of the cable harness mount 180 and a section of the tie-wrap extending between the tie-wrap receiving apertures 221.

The end of the tape section of the tie wrap is then engaged with the tie-wrap head. Therefore, the tie-wrap is locked. The tie-wrap is drawn into its locked position with the head passing along the tape section and being prevented from sliding in the other direction. The guide channel 204 formed in the head 202 of the harness attachment 200, acting as the first harness securing means, acts as a guiding means to further guide and align the tie-wrap around the top of the cable harness mount 180.

One advantage of the above described embodiment is that the harness attachment 200 can adjust to the size of the cable harness by drawing the tape section 208 through the passage 203 formed in the head 202.

Another advantage of the embodiments described with reference to FIGS. 12 and 13 is that the cable harness to cable harness mount connection is provided with redundancy against failure. As such, the harness attachment acts as a first harness securing means to secure the harness to the cable harness mount. The tie-wrap then acts as a second harness securing means when the tie-wrap is fixedly mounted about the cable harness mount. Therefore, if one of the harness securing means fails then the other harness securing means will retain the harness to the cable harness mount in a secured condition without failure of the connection occurring.

Similarly, the support attachment acts as a first mount securing means to secure the cable harness mount to the support. The tie-wrap then acts as a second mount securing means when the tie-wrap is fixedly mounted about the support. Therefore, if one of the mount securing means fails then the other mount securing means will retain the support to the cable harness mount in a secured condition without failure of the connection occurring.

This redundancy against failure of each connection ensures that the cable harness will not become detached from the support.

Figure 14:
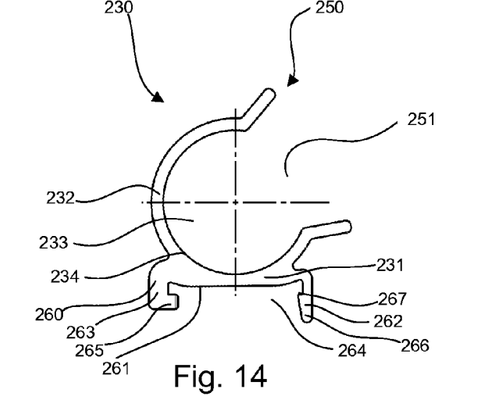
FIG. 14 shows a side view of a cable harness mount according to another embodiment.
Figure 15:
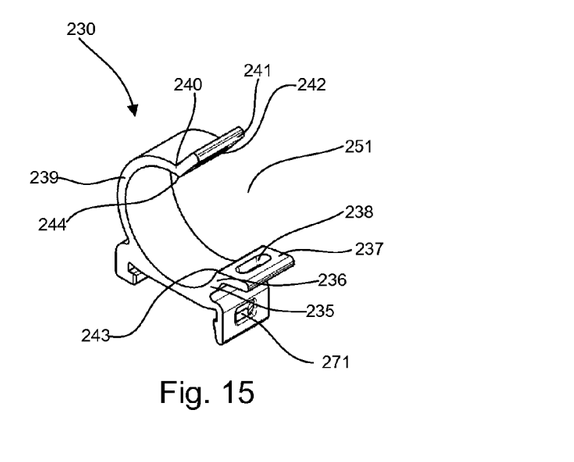
FIG. 15 shows perspective view of the cable harness mount shown in FIG. 14.

Another such arrangement is shown in FIGS. 14 and 15. The embodiment is generally the same as the above described embodiments, in particular the embodiment shown in FIGS. 1 to 5, however in this embodiment the arrangement of the harness attachment differs. As features and components of this embodiment are generally the same as the embodiments described above, a detailed description will be omitted herein. Furthermore, it will be understood that features and components correspond to features and components described above and that different features may be used interchangeably.

In the arrangement shown in FIGS. 14 and 15, a cable harness mount 230 has a support attachment 260 and a mount body 231 which has a harness receiving portion 232. The harness receiving portion 232 forms a recess or harness receiving space 233 in the mount body 231 in which a cable harness (not shown in FIGS. 14 and 15) is receivable. In this embodiment, the harness receiving space 233 is generally circular.

The cable harness mount 230 further comprises a harness attachment 250. The harness attachment 250 acts as a first harness securing means or unit. The harness attachment 250 retains the cable harness in a secured condition with the cable harness mount 230. A tie-wrap (not shown in FIGS. 14 and 15) acts as a second harness securing means or unit, as will become apparent hereinafter.

The harness receiving portion 232 has a harness receiving surface 234 against which the cable harness is configured to locate. The harness attachment 250 comprises the harness receiving portion 232 made up of a first part 235 and a second part 239. At least one of the parts acts as a resilient portion. In the present embodiment, the second part 239 is movable relative to the first part 235. That is, the second part 239 is resiliently deformable relative to the first part 235. The second part 239 is able to deflect relative to the first part 235. In this embodiment, the first and second parts 235, 239 of the harness receiving portion 232 are integrally formed. The second part 239 is able to deform, whilst the first part 235 retains rigidity. The second part 239 is resilient and able to return to its neutral position as shown in FIGS. 14 and 15.

The first part 235 extends from the mount body 231. The first part 235 extends arcuately to form a first concave face of the harness receiving surface 234. The concave face on the first part 235 extends from the centre of the mount body 231 in a circumferential direction. In the arrangement shown in FIGS. 14 and 15, the arc defining the concave face of the first part 235 sweeps through an acute angle and so the cable harness is able to protrude out of or away from the first part 235 of the harness receiving portion 232. The first part 235 has a free end 236. The free end 236 comprises a tab 237 that extends outwards from the first part 235 at an oblique angle. The tab 237 comprises a tie-wrap receiving aperture 238 located at its centre.

The second part 239 extends from the mount body 231 at an opposing end of the cable mount 230. The second part 239 extends arcuately upwards to create a concave harness receiving surface 234. The concave harness receiving surface 234 of the second part 239 extends from the centre of the mount body 231 in a circumferential direction. In the arrangement shown in FIGS. 14 and 15, the second part 239 extends around and over the top of the cable harness (not shown). The arc defining the concave receiving surface 234 of the second part 239 sweeps through an angle greater than 180 degrees. The second part 239 has a free end 240. The free end 240 comprises a tab 241 that extends outwards from the second part 239 at an oblique angle. The tab 241 comprises a tie-wrap receiving aperture 242 located at its centre. The first and second parts 235, 239 diverge from each other when they extend from the mount body 231. The first and second parts 235, 239 converge towards each other at their free ends 236, 240.

In this embodiment, the tie-wrap receiving apertures 238, 242 are sized to receive two tie-wraps. The first tie-wrap is used to secure the first and second parts 235, 239 together to prevent the harness from being removed from the harness receiving space 233. The second tie-wrap is secured through the tie-wrap receiving apertures 238, 242 and through the support attachment 260 to attach the cable harness mount 230 to the support.

In this arrangement, the concave harness receiving surface 234 sweeps through an angle of less than 360 degrees so that the free ends 236, 240 of the first and second parts 235, 239 do not touch. The tabs 237, 241 on the free ends 236, 240 of the first and second parts 235, 239 are separated by an opening 251. The arc defining the concave harness receiving surface 234 sweeps through an angle greater than 180 degrees. The opening 251 allows the cable harness to be pushed into the harness receiving portion 233 past the resiliently deformable first and second parts 235, 239. The tabs 237, 241 are orientated to help guide the cable harness into the opening 251. The tabs form a converging mouth. The tabs 237, 241 extend at an oblique angle outwardly from the free ends 236, 240 of the first and second parts 235, 239. The tabs 237, 241 surfaces converge as the distance to the free ends 236, 240 of their respective parts 235, 239 decreases. The converging surfaces of the tabs 237, 241 act as a funnel and guide the cable harness through the opening 251 into the harness receiving portion 233. The tabs 237, 241 bias the resilient first and second parts 235, 239 away from each other to widen the opening 251 when the harness locates against them to allow the cable harness 20 to be inserted into the harness receiving portion 233.

The first and second parts 235, 239 act as a first harness securing means. The resilient parts 235, 239 restrict the movement of the cable harness. The opening 251 between a vertex 243 of the harness receiving surface 234 and tab 237 and a vertex 244 of the harness receiving surface 234 and tab 241 is smaller than the diameter of the cable harness and so will retain the cable harness. The cable harness can be removed by the user with the use of a specific force if necessary. A tie-wrap can then be used to secure the first and second parts 235, 239 by passing it through the tie-wrap receiving apertures 238, 242 and engaging the ratchet in the tie-wrap head with the teeth of the tape section. This is advantageous because it means a user can remove and refit a cable harness without causing damage to the cable harness of the cable harness mount. The user would only damage the tie-wrap by cutting it off the mount. Once maintenance had been completed a new tie-wrap could be used to secure the same mount.

In the embodiment shown in FIGS. 14 and 15, the support attachment 260, acting as the first support securing means, is a releasable clip, generally the same as the first support securing means shown in FIGS. 1 to 5. As the features and components of the support attachment of this embodiment are generally the same as the embodiment described in reference to FIGS. 1 to 5, a detailed description will be omitted herein, although other embodiments for the support attachment are envisaged.

The cable harness mount 230 has a base 261. The base 261 is configured to lie against the support (not shown). The support attachment 260 is on the base 261. The support attachment 260 has a first attachment element 262 and a second attachment element 263 on the base 261. The first and second attachment elements 262, 263 are spaced from each other along the base 261.

The first attachment element 262 protrudes from the base 261 at one end. The second attachment element 263 protrudes from the base 261 at an opposing end. A support receiving space 264 is formed therebetween. The first attachment element 262 has a tab 266 with a shoulder 267. The shoulder 267 extends substantially parallel to the base 261. The second attachment element 263 has a lip 265 extending substantially parallel to the base 261. The lip 265 protrudes into the support receiving space 264. The first and second attachment elements 262, 263 are configured to receive the or part of the support (not shown) therebetween. The support attachment 260 acts as a releasable clip.

To mount a cable harness (not shown) to the cable harness mount 230, the harness is received by the harness receiving portion 232. The cable harness is pushed into opening 251 by the user. The cable harness locates against the tabs 237, 241 on either side of the opening 251. As the cable harness is pushed further into the harness receiving portion 233 the chord between the two points of the cable harness' circumference in contact with the tabs 237, 241 increases. This results in the resiliently deformable first and second parts 235, 239 being urged away from each other, increasing the size of the opening 251. This continues until the opening 251 is the same size as the diameter of the cable harness. Once the cable harness' diameter has passed the vertices 243, 244 of the tabs 237, 241, the resiliently deformable first and second parts 235, 239 move back to their original position, securing the cable harness in place. The cable harness is then held between the first and second concave faces of the harness receiving surface 234. A tie-wrap can then be used to secure the first and second parts 235, 239 by passing it through the tie-wrap receiving apertures 238, 242 and engaging the ratchet in the tie-wrap head with the teeth of the tape section.

To mount the cable harness mount 230 to the support, the support is received by a support attachment 260, between first and second attachment elements 262, 263. At this stage the cable harness mount 230 is secured to the support by the support attachment 260, acting as the first mount securing means. With this arrangement the user is able to release the cable harness mount 230 whilst preparing to attach the tie-wrap and possibly the cable harness if it has not already been secured in place.

The tie-wrap (not shown), acting as the fastener, is then passed through one of the first and second tie-wrap receiving apertures 271 (the second tie-wrap receiving aperture is not visible in FIGS. 14 and 15). For example, the tie-wrap is received through a first receiving aperture 271, passing over the support receiving space 264 and received through a second receiving aperture (not shown) on the opposing side of the cable harness mount 230. The tie-wrap receiving apertures 271 align the path of the tie-wrap. The support 230 is then disposed between the base 261 of the cable harness mount 230 and a section of the tie-wrap extending between the tie-wrap receiving apertures 271.

The tape section of the tie-wrap is then passed around the second part 239 of the harness attachment 250 and through the tie-wrap receiving aperture 242 in the tab 241. The tape section of the tie-wrap further passes through the tie-wrap receiving aperture 238 in the tab 237 on the first part 235 of the harness attachment 250. The tie-wrap receiving apertures 238, 242 in the tabs 237, 241 further serve to align the path of the tie-wrap. The tape section of the tie-wrap is engaged with the tie-wrap head. Therefore, the tie-wrap is locked. The tie-wrap is drawn into its locked position with the head passing along the tape section and being prevented from sliding in the other direction.

As the tie-wrap head is passed along the tape section, the tie-wrap tightens around the cable harness mount 230. If the cable harness has a smaller diameter than the harness receiving portion 233 then tightening the tie-wrap causes the second part 239 of the harness attachment 250 to deform relative to the first part 235 of the harness attachment 250. This brings the tabs 237, 241 closer together and closes the opening 251. The tie-wrap head is drawn along the tape section until the cable harness is sufficiently locked in place by abutment with the harness receiving surface 234, between the first and second concave faces.

One advantage of the above described embodiment is that the cable harness may be easily removed and reinserted into the same cable harness mount 230 by cutting the tie-wrap 240 and pulling the cable harness out. The harness attachment 250 can also be adjusted to roughly match the size of the cable harness.

Another advantage of the embodiments described with reference to FIGS. 14 and 15 is that the cable harness to cable harness mount connection is provided with redundancy against failure. As such, the harness attachment acts as a first harness securing means to secure the harness to the cable harness mount. The tie-wrap then acts as a second harness securing means when the tie-wrap is fixedly mounted about the cable harness mount. Therefore, if one of the harness securing means fails then the other harness securing means will retain the harness to the cable harness mount in a secured condition without failure of the connection occurring.

Similarly, the support attachment acts as a first mount securing means to secure the cable harness mount to the support. The tie-wrap then acts as a second mount securing means when the tie-wrap is fixedly mounted about the support. Therefore, if one of the mount securing means fails then the other mount securing means will retain the support to the cable harness mount in a secured condition without failure of the connection occurring.

This redundancy against failure of each connection ensures that the cable harness will not become detached from the support.

Although in the above described embodiment the harness receiving portion is defined by an arcuate first part that sweeps through an acute angle from the centre of the mount and an arcuate second part that sweeps through a reflex angle in the opposite direction, it is understood that the arrangement is not limited thereto. For example, in another arrangement the angles through which the arcuate first and second parts sweep may vary, as long as the angle swept out by both parts added together is greater than 180 degrees.

With the embodiments described herein the section of the harness held by the cable harness mount is fully encapsulated by the cable harness mount assembly and so does not come into contact with the support. Therefore, the harness is prevented from wearing against or catching on the support.

It will be understood that the above arrangements of cable harness mounts may be provided in different sizes to accommodate different sized cable harnesses. However, it will be understood that the above described cable harness mounts are able to accommodate a range of different sized cable harnesses.

In the above described embodiments, the second part of the harness receiving portion is at least partially retained by the tie-wrap so that the cable harness is held between the first and second parts of the harness receiving portion. That is, the tie-wrap acts on the second part of the harness receiving portion. An advantage of this arrangement is that the tie-wrap does not locate directly against the harness, and cannot rub thereagainst. However, it will be understood that in an alternative arrangement, the tie-wrap may act directly on the cable harness. In such an arrangement, the tie-wrap acts on the cable harness to urge it towards the surface of the harness receiving portion so that the cable harness is secured between the tie-wrap and the surface of the harness receiving portion.

Although in the above described embodiments the harness receiving portion defines a recess in which the cable harness is received, it will be appreciated that the harness receiving portion may be a surface of the mount body against which the cable harness is locatable.

Although the mount and mount assembly are described for mounting a cable harness mount to a support in the above described embodiments, it will be understood that the invention is not limited thereto. For example, the mount may be used to mount another component, such as a gas or fluid pipe, to a support.

It will be appreciated that the foregoing description is given by way of example only and that modifications may be made to the present invention without departing from the scope of the appended claims.

The invention claimed is:

1. A mount for mounting a cable harness to a support, said mount comprising:
 a harness receiving portion;
 a support attachment comprising a support receiving space between a base and a support locating element, the support attachment configured to retain a support received in the support receiving space;
 a fastener attachment portion; and
 a fastener extending from said fastener attachment portion, said fastener securing the mount to said support, said fastener attachment portion having an aperture configured to receive the fastener while the mount is secured to the support by the fastener, wherein the mount is configured to orientate said fastener to extend about the harness receiving portion to secure said cable harness to the mount when the mount is secured to said support by the fastener
 wherein the support attachment is configured as a first mount securing device retaining the mount to said support while the support is received in the support receiving space, and the fastener is configured as a second mount securing the mount to said support.

2. A mount according to claim 1, wherein the harness receiving portion is a recess in which a cable harness is at least partially receivable.

3. A mount according to claim 1, wherein the fastener attachment portion is configured to orientate the fastener to extend over the harness receiving portion to secure the cable harness to the harness receiving portion.

4. A mount according to claim 1, wherein the fastener attachment portion comprises two fastener receiving parts between which at least a section of the fastener is receivable such that the fastener is extendable over the fastener receiving portion.

5. A mount according to claim 1, further comprising a harness attachment configured to secure a cable harness to the mount, such that the harness attachment is configured to act as a first harness securing means, with the fastener acting as a second harness securing means when the mount is secured to a support by the fastener.

6. A mount according to claim 5, wherein the harness attachment is a releasable clasp.

7. A mount according to claim 5, wherein the harness attachment comprises a tie-wrap securing arrangement.

8. A mount according to claim 5, wherein the harness attachment comprises at least one resilient portion configured to urge the harness against an opposing side of the harness receiving portion.

9. A mount according to claim 1, further comprising a guide configured to orientate the fastener to extend over the harness receiving portion to secure the cable harness to the harness receiving portion.

10. A mount according to claim 1, further comprising a support attachment configured to retain the mount to a support, such that the support attachment is configured to act as a first mount securing means, with the fastener acting as a second mount securing means when the mount is secured to the support by the fastener.

11. A mount according to claim 1, wherein the fastener is permanently mounted to the mount.

12. A mount according to claim 1, wherein the fastener is detachable from the mount.

13. A mount according to claim 1 wherein the fastener is a tie-wrap.

14. A cable harness mount assembly comprising:
   a harness mount including a first surface configured to receive a cable harness, a support attachment with a support receiving space, a second surface opposite to the first surface and configured to engage a first support surface of a support received in the support receiving space, and sides between which are the first and second surfaces;
   a fastener attachment including a first opening in the first side and a second opening in the second side, and
   a fastener including a tie strap configured to extend around the cable harness, through the first and second openings and across a second support surface opposite to the first support surface, wherein the fastener secures the harness mount to the support and the cable harness to the harness mount
   wherein the support attachment is configured as a first mount securing device configured to secure the mount to said support while the support is received in the support receiving space, and the fastener is configured as a second mount securing the mount to the support.

15. The cable harness mount assembly of claim 14 wherein the harness mount includes a bendable arm extending from one of the sides of the harness mount, wherein the bendable arm has a first surface configured to engage the cable harness and a second surface, opposite to the first surface, configured to engage the tie strap.

16. The cable harness mount assembly of claim 15 wherein the bendable arm includes a first clasp portion configured to engage a second clasp portion on the other side of the harness mount.

17. The cable harness mount assembly of claim 15 wherein the second surface of the bendable arm includes a groove to receive the tie strap.

18. The cable harness mount assembly of claim 14 wherein the tie strap and the first and second openings, and a first surface of the harness mount are aligned in a common plane.

19. The cable harness mount assembly of claim 18 wherein the common plane is perpendicular to an axis of a portion of the cable harness extending through the harness mount.

20. The cable harness mount assembly of claim 14 wherein the tie strap extends around a perimeter of the harness mount.

21. A mount assembly for mounting a cable harness to a support, said mount assembly comprising:
   a cable harness mount having interior surface configured to wrap around a cable harness and the cable harness including a mount body, a harness receiving section extending from a first side of the mount body, a first harness attachment at an end of the harness receiving section and a second harness attachment at a second side of the side of the mount body, wherein the first harness attachment is configured to releasably latch to the second harness attachment, the cable harness mount is a single piece component and the mount body includes a recess configured to receive a support; and
   a fastener configured to wrap around an outer surface of the harness receiving section and extend through and between openings on the first and second sides of the mount body such that the support is between the fastener and the mount body.

* * * * *